US012792415B2

(12) United States Patent
Yadav et al.

(10) Patent No.: US 12,792,415 B2
(45) Date of Patent: Nov. 10, 2026

(54) DYNAMIC SLICING USING A BALANCED APPROACH BASED ON SYSTEM RESOURCES FOR MAXIMUM OUTPUT

(71) Applicant: Dell Products L.P., Round Rock, TX (US)

(72) Inventors: Sunil K. Yadav, Bangalore (IN); Soumen Acharya, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1046 days.

(21) Appl. No.: 17/936,950

(22) Filed: Sep. 30, 2022

(65) Prior Publication Data

US 2024/0111593 A1 Apr. 4, 2024

(51) Int. Cl.
*G06F 9/50* (2006.01)

(52) U.S. Cl.
CPC .......... *G06F 9/5044* (2013.01); *G06F 9/5033* (2013.01); *G06F 9/5055* (2013.01)

(58) Field of Classification Search
CPC ..... G06F 9/5044; G06F 9/5033; G06F 9/2055
See application file for complete search history.

(56) References Cited

U.S. PATENT DOCUMENTS

| | | | | |
|---|---|---|---|---|
| 2010/0250751 | A1 | 9/2010 | Leggette et al. | |
| 2021/0149703 | A1* | 5/2021 | Patle | G06F 16/188 |
| 2021/0334042 | A1 | 10/2021 | Gao et al. | |
| 2022/0043776 | A1 | 2/2022 | Okamoto | |
| 2022/0091937 | A1 | 3/2022 | Baptist et al. | |
| 2022/0121525 | A1* | 4/2022 | Brenner | G06F 16/185 |
| 2022/0121528 | A1 | 4/2022 | Brenner et al. | |
| 2022/0237288 | A1 | 7/2022 | Strogov et al. | |
| 2022/0334925 | A1* | 10/2022 | Rakesh | G06F 11/1448 |

* cited by examiner

*Primary Examiner* — Courtney Harmon
(74) *Attorney, Agent, or Firm* — Workman Nydegger

(57) ABSTRACT

One example method includes gathering information regarding filesystem resources, based on the system resource information, identifying a thread pool size, starting a thread pool having the thread pool size, where the thread pool size is dynamically adjustable based on changes in the system resources, crawling a filesystem and identifying crawl jobs to be performed, adding the crawl jobs to the thread pool, and performing the crawl jobs. The method may further include slicing data in one or more directories that have been crawled.

18 Claims, 3 Drawing Sheets

DYNAMIC SLICING USING A BALANCED APPROACH BASED ON SYSTEM RESOURCES FOR MAXIMUM OUTPUT

RELATED APPLICATIONS

This application is related to: (1) U.S. patent application Ser. No. 17/660,773, entitled BALANCING OF SLICES WITH CONSOLIDATION AND RE-SLICING, and filed Apr. 26, 2022; and (2) U.S. patent application Ser. No. 17/936,935 entitled REPURPOSING PREVIOUS SLICING ARTIFACTS FOR A NEW SLICING FOR CONTROLLABLE AND DYNAMIC SLICE SIZE AND REDUCING THE IN-MEMORY FOOTPRINT FOR LARGER SHARES HAVING BILLIONS OF FILES, and filed the same day herewith. All of the aforementioned applications are incorporated herein in their respective entireties by this reference.

FIELD OF THE INVENTION

Embodiments of the present invention generally relate to data protection. More particularly, at least some embodiments of the invention relate to systems, hardware, software, computer-readable media, and methods, for dynamically slicing data to enable a backup process to back up the data while efficiently using computing resources.

BACKGROUND

As indicated by an embodiment disclosed in one or more of the Related Applications, data may be divided into slices so as to enable parallel backup threads, one for each slice of data. In this way, data may be backed up relatively more efficiently. However, such approaches may not always be well suited to the circumstances. For example, one such slicing mechanism may be configured to run a specific number of threads, to a particular depth in a file system. To illustrate, a mechanism may operate to run the threads needed to reach to depth level four in the filesystem directories, and any levels below that depth might be crawled using one thread each.

Such an approach may not provide for optimal resource utilization. Further, such approaches may be static in terms of their application and resource consumption, and may utilize overloaded, or underloaded, backup systems. This could result in non-optimal performance of the backup process.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
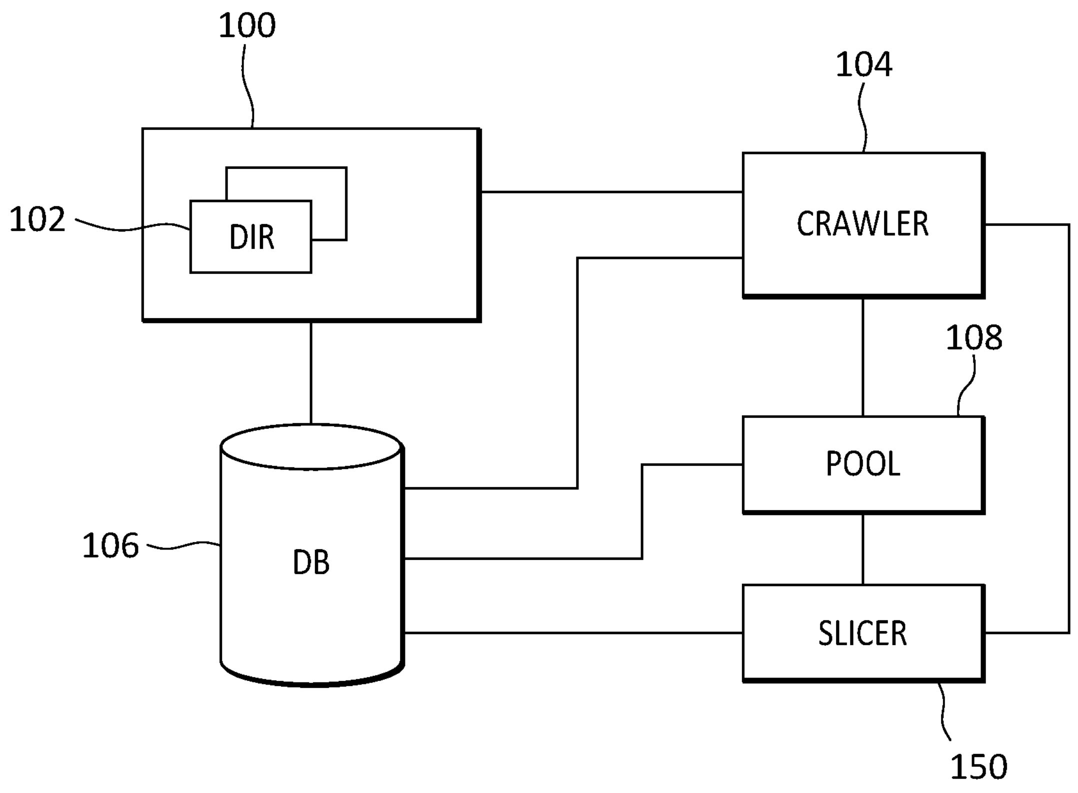
FIG. 1 discloses aspects of an example operating environment for some embodiments.

Embodiments of the present invention generally relate to data protection. More particularly, at least some embodiments of the invention relate to systems, hardware, software, computer-readable media, and methods, for dynamically slicing data to enable a backup process to back up the data while efficiently using computing resources.

In general, some embodiments of the invention may be directed to a method that operates to efficiently crawl a file share. In some embodiments, a fully multi-threaded approach may be implemented to crawl the entire file share.

In an embodiment, a dynamic thread pool may be created based on the hardware resource available. The size of the thread pool may vary. This approach may help to ensure efficient utilization of hardware resources to the fullest, while avoiding overloading the system resources. A crawler process may be employed in a file share and may operate such that as the crawler process encounters a directory, or other specified grouping or level of data, in the file share, the crawler process may push a crawl job for that directory into the thread pool. A thread in the thread pool may then perform the crawl job, and calculate the respective sizes of the data slices, or simply ‘slices,’ into which the directory will be divided. The slice sizes may be determined based on various criteria, such as the number of backup threads available at backup time, and the amount of system resources available to support the backup thread(s). A default slice size may also be specified.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that large filesystems may be crawled relatively quickly and efficiently, as compared with single thread crawling processes for example, and may thus enable the slicing of data to be performed efficiently. An embodiment may, in determining slice sizes, take into account the resources needed to back up the data slices. An embodiment may make efficient and optimal use of available resources when performing one or more crawling processes.

Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful. New and/or modified data collected and/or generated in connection with some embodiments, may be stored in one or more filesystems (FS) that may be located on-premises, such as at an enterprise, and/or at a remote site such as a cloud storage site. This data may be backed up in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)s.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

A filesystem data layout can be distributed in different folders in a non-homogenous way. Backing up such file shares using a parallel backup mechanism is a challenge. To achieve an effective parallel backup mechanism for a file share, there is a need to create logical chunks, or slices, of a filesystem in non-overlapping manner such that each slice can be backed up independently via separate respective backup channel. This approach may provide better backup performance for a large file share.

The slices may be created within a threshold limit so that all slices are the same size, or nearly so, such as within about 5-10 percent of each other. The use of uniformly sized slices may enable an optimum, or at least improved, utilization of backup streams. Some example slicing processes are disclosed in the Related Applications. In some circumstances, such slicing processes may have certain limitations with respect to the way filesystem is crawled, and with respect to the in-memory data tagging and slice creation. Thus, some embodiments of the invention may optimize the crawling mechanism by using an optimum thread pooling mechanism along with a local database driven schema model for tagging and slice creation.

C. Aspects of an Example System Configuration

Directing attention now to FIG. 1, some details are provided concerning an example filesystem (FS) 100 in connection with which some embodiments may be implemented. The configuration disclosed in FIG. 1 is simplified for clarity and the purposes of illustration.

The FS 100 may reside on-premises, and/or may be distributed across multiple physical, and geographically distributed, sites. In general however, the FS 100 is not required to have any particular size or configuration, and the foregoing is provided only by way of example. Data in the FS 100 may reside in one or more directories 102. The FS 100 may further include a crawler 104, which may take the form of a crawler module for example, which, in general, is operable to crawl through, and identify, the directories 102. In some embodiments, the crawler 104 may comprise an entity that is external to the FS 100.

The crawler 104 may communicate with a database 106 in which data from the directories 102 may be stored. Crawl jobs identified by the crawler 104 may be pushed into a thread pool 108 which may comprise one or more threads that may be executed to crawl a particular directory 102. Finally, a slicer 150, which may or may not be part of the FS 100, may comprise a process for creating slices of the stored data, and tagging those slices.

With continued reference to FIG. 1, the crawling and slicing processes may overlap with each other, or the crawling process may be performed prior to the start of the slicing process. In the latter case, the crawling process, when completed, may perform a handoff to the slicing process. One or more operations of the slicing process may be contingent upon prior performance of the crawling process, or at least part of the crawling process. For example, a slicing process may be performed based upon an outcome, and/or completion, of the crawling process. No particular order of processes, nor that of their respective operations, is required however.

D. Aspects of Example Methods

Figure 2:
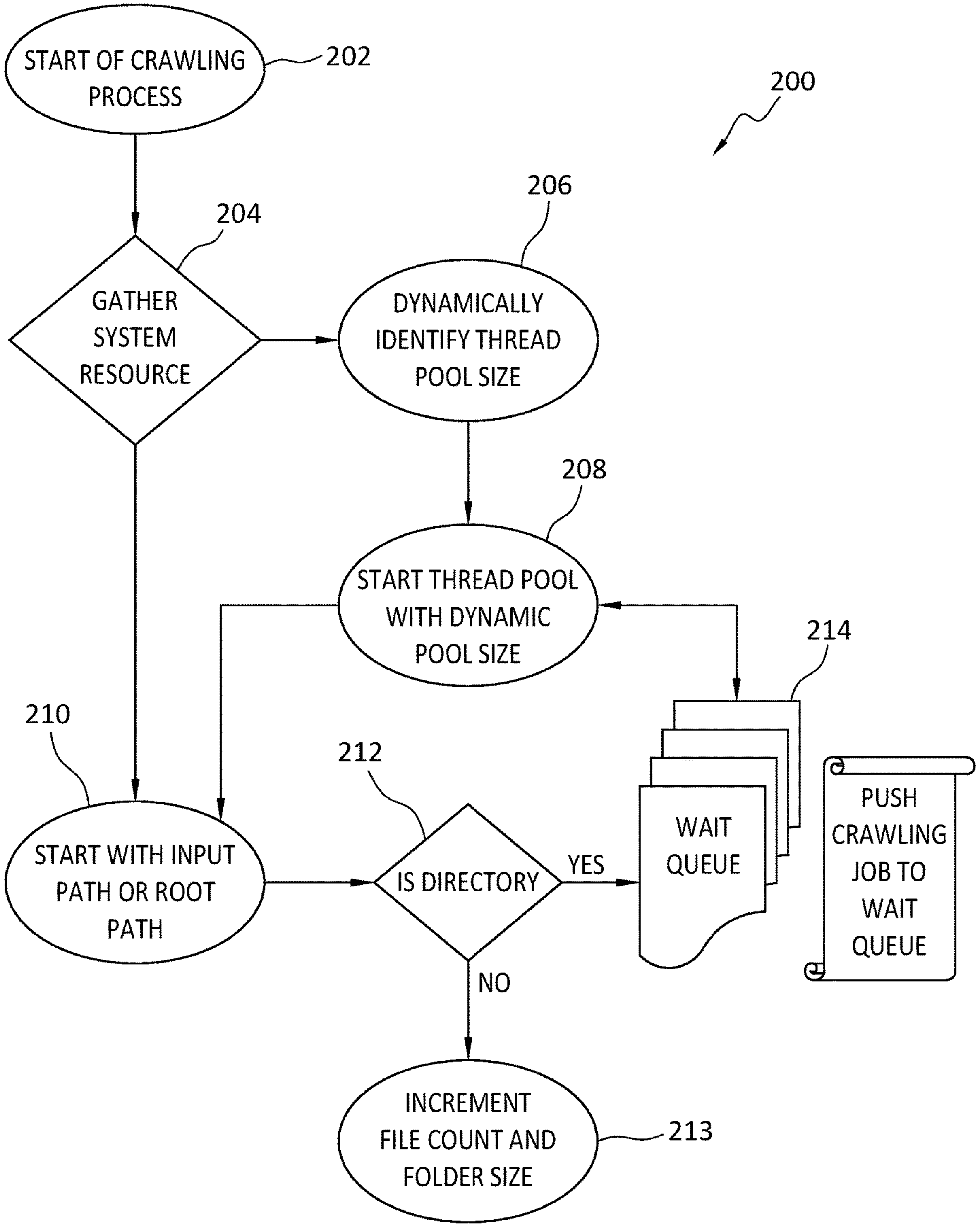
FIG. 2 discloses aspects of an example method according to some embodiments.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, aspects of a crawling method, an example of which is denoted at 200, are disclosed. One or more of the operations of the method 200 may be performed by a crawler, an example of which is disclosed in FIG. 1. Note that in this disclosure, a distinction is drawn between a crawling process, and one or more crawl jobs that may be spawned, or at least identified, by a crawling process.

At 202, the crawling process may be started. Initially, information concerning system resources may be gathered 204. Such information may include, but is not limited to, the amount of memory, storage, and processing capacity, of the system.

A thread pool size may then be determined 206 which may specify a size of the thread pool expressed as a number of threads, or crawl jobs, to be executed. The size of the thread pool may be determined with reference to the system resource information that was gathered at 204. For example, the size of the thread pool may be such as to remain within, and not overtax, the system capabilities to execute the threads. The size of the thread pool may be automatically adjusted based, for example, on considerations such as, but not limited to, (1) changes in the system resources available to support crawl jobs, (2) a number of data slices that have been identified, (3) the number of crawl jobs that have been identified. Note that considerations (2) and (3) may not yet have been determined when the method 200 is first instantiated but as the method 200 may be performed recursively, (2) and (3) may have been determined by the time a subsequent iteration of the method 200 has been started.

Once the thread pool size has been determined 206, the thread pool may be started 208. After the thread pool has been started 208, a crawl of the filesystem, that is, a crawling process, may begin 210. The crawling process may start at any location, or level, within the filesystem. In some embodiments, the crawl may begin at the input path, that is, the path by way of which information is input to the filesystem. Additionally, or alternatively, the crawl 210 may begin at the filesystem root path, that is, the root of all directories in the filesystem.

At each branch, node, or other junction, in the filesystem, the crawling process may perform a check 212 to determine whether the node, for example, is a directory or not. If the check 212 determines that the node encountered by the crawling process 210 is not a directory, the crawling process 210 may assume that the node is a file and, consequently, may 213 increment a file count for the folder within which the file is located, and also increment the folder size by the size of the data in the file. In this way, a folder size, as well as the number of files in the folder, may be calculated by the crawling process 210.

On the other hand, if the check 212 reveals that the node is a directory, the crawling process 210 may push a crawl job 214, specific to that directory, to a wait queue, also referred to herein as a thread pool. As shown, the method 200 may, for each crawl job in the thread pool, return from 214 to 208 to begin one of the crawl jobs in the thread pool. A crawl job may identify an amount of data that is contained in a directory that is examined by the crawl job.

The crawl jobs in the thread pool may be performed in any suitable order. In one embodiment, the crawl jobs may be performed on a first-in-first-out (FIFO) basis. In another embodiment, the crawl jobs may be performed according to the size of the directory with which they are associated, such as from largest to smallest, or smallest to largest. The size of the thread pool may vary as directories are encountered by the crawling process 210. Further, one or more individual crawl jobs, corresponding to respective directories, may be performed while the crawling process 210 is still traversing the filesystem.

As explained above then, an outcome of the method 200 may be the identification, creation, and execution, of a group of one or more crawl jobs that need to be performed with respect to the directories in a filesystem. As discussed in the Related Application filed the same day herewith, the conclusion of the method 200, that is when the entire filesystem, or a designated portion of the filesystem, has been crawled, may trigger the start of a slicing process, such as by the slicer 150 for example, directed to the data stored in the filesystem, or filesystem portion, that has been crawled.

E. Further Example Embodiments

Following are some further example embodiments of the invention. These are presented only by way of example and are not intended to limit the scope of the invention in any way.

Embodiment 1. A method, comprising: gathering information regarding filesystem resources; based on the system resource information, identifying a thread pool size; starting a thread pool having the thread pool size, wherein the thread pool size is dynamically adjustable based on changes in the system resources; crawling a filesystem and identifying crawl jobs to be performed; adding the crawl jobs to the thread pool; and performing the crawl jobs.

Embodiment 2. The method as recited in embodiment 1, wherein one of the crawl jobs is specific to a particular directory in the filesystem.

Embodiment 3. The method as recited in any of embodiments 1-2, wherein the thread pool size is dynamically adjusted based on a detected change in the system resources.

Embodiment 4. The method as recited in any of embodiments 1-3, wherein performing one of the crawl jobs identifies a size of a directory to which the crawl job is directed.

Embodiment 5. The method as recited in any of embodiments 1-4, wherein the filesystem resources comprise hardware and/or software resources available to perform crawl jobs.

Embodiment 6. The method as recited in any of embodiments 1-5, wherein when a filesystem node other than a directory is encountered by the crawling, a file count and a folder size are incremented for that filesystem node.

Embodiment 7. The method as recited in any of embodiments 1-6, wherein the thread pool comprises a wait queue.

Embodiment 8. The method as recited in any of embodiments 1-7, wherein one of the crawl jobs is performed while the crawling is ongoing.

Embodiment 9. The method as recited in any of embodiments 1-8, wherein one of the crawl jobs comprises slicing data in a directory according to one or more criteria.

Embodiment 10. The method as recited in any of embodiments 1-9, wherein a data slice, of a directory, created by one of the crawl jobs is re-sliced in response to a change detected in a size of the directory in the filesystem.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
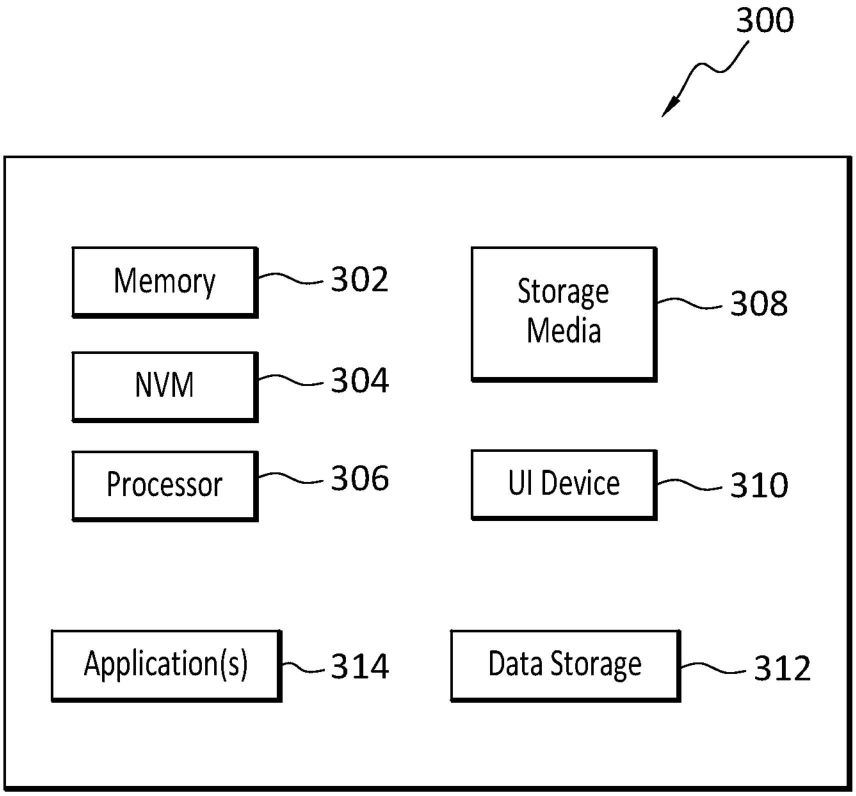
FIG. 3 discloses aspects of an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 302 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

gathering system resource information regarding availability of hardware resources;

based on the system resource information, identifying a thread pool size;

starting a thread pool having the thread pool size, wherein the thread pool size is dynamically adjustable based on changes in the system resources available to support crawl jobs, a number of data slices that have been identified, and/or a number of crawl jobs that have been identified;

crawling a filesystem to traverse the filesystem, comprising:

detecting a directory during traversal of the filesystem; and in response to detecting the directory, generating a crawl job specific to the detected directory during the traversal, wherein the crawl job identifies an amount of data contained in the detected directory; and adding the generated crawl job to the thread pool for execution while the traversal of the filesystem continues, wherein the generated crawl job is added to the thread pool before traversal of the filesystem is completed; and performing each crawl job in the thread pool to crawl a respective directory, wherein one or more individual crawl jobs are performed while the filesystem is still being traversed and while additional directories are still being detected during the traversal.

2. The method as recited in claim 1, wherein the thread pool size is dynamically adjusted based on a detected change in the system resources.

3. The method as recited in claim 1, wherein performing one of the crawl jobs identifies a size of a directory to which the crawl job is directed.

4. The method as recited in claim 1, wherein the filesystem resources comprise hardware and/or software resources available to perform crawl jobs.

5. The method as recited in claim 1, wherein when a filesystem node other than a directory is encountered by the crawling, a file count and a folder size are incremented for that filesystem node.

6. The method as recited in claim 1, wherein the thread pool comprises a wait queue.

7. The method as recited in claim 1, wherein one of the crawl jobs is performed while the crawling is ongoing.

8. The method as recited in claim 1, wherein one of the crawl jobs comprises slicing data in a directory according to one or more criteria.

9. The method as recited in claim 1, wherein a data slice, of a directory, created by one of the crawl jobs is re-sliced in response to a change detected in a size of the directory in the filesystem.

10. A non-transitory storage medium having stored therein instructions that are executable by one or more hardware processors to perform operations comprising:

gathering system resource information regarding availability of hardware resources;

based on the system resource information, identifying a thread pool size;

starting a thread pool having the thread pool size, wherein the thread pool size is dynamically adjustable based on changes in the system resources available to support crawl jobs, a number of data slices that have been identified, and/or a number of crawl jobs that have been identified;

crawling a filesystem by:

detecting a directory during traversal of the filesystem;

in response to detecting the directory, generating a crawl job specific to the detected directory during the traversal, wherein the crawl job identifies an amount of data contained in the detected directory; and adding the generated crawl job to the thread pool for execution while the traversal of the filesystem continues, wherein the generated crawl job is added to the thread pool before traversal of the filesystem is completed; and performing each crawl job in the thread pool to crawl a respective directory, wherein one or more individual crawl jobs are performed while the filesystem is still being traversed and while additional directories are still being detected during the traversal.

11. The non-transitory storage medium as recited in claim 10, wherein the thread pool size is dynamically adjusted based on a detected change in the system resources.

12. The non-transitory storage medium as recited in claim 10, wherein performing one of the crawl jobs identifies a size of a directory to which the crawl job is directed.

13. The non-transitory storage medium as recited in claim 10, wherein the filesystem resources comprise hardware and/or software resources available to perform crawl jobs.

14. The non-transitory storage medium as recited in claim 10, wherein when a filesystem node other than a directory is encountered by the crawling, a file count and a folder size are incremented for that filesystem node.

15. The non-transitory storage medium as recited in claim 10, wherein the thread pool comprises a wait queue.

16. The non-transitory storage medium as recited in claim 10, wherein one of the crawl jobs is performed while the crawling is ongoing.

17. The non-transitory storage medium as recited in claim 10, wherein one of the crawl jobs comprises slicing data in a directory according to one or more criteria.

18. The non-transitory storage medium as recited in claim 10, wherein a data slice, of a directory, created by one of the crawl jobs is re-sliced in response to a change detected in a size of the directory in the filesystem.

* * * * *